United States Patent [19]

Bafaro

[11] 4,230,972
[45] Oct. 28, 1980

[54] DYNAMIC FOCUS CIRCUITRY FOR A CRT DATA DISPLAY TERMINAL

[75] Inventor: Michael P. Bafaro, Park Ridge, Ill.

[73] Assignee: Motorola, Inc., Schaumburg, Ill.

[21] Appl. No.: 24,359

[22] Filed: Mar. 27, 1979

[51] Int. Cl.³ ............................................. H01J 29/58
[52] U.S. Cl. ................................ 315/382; 315/31 TV
[58] Field of Search ..................... 315/31 TV, 382, 368

[56] References Cited

U.S. PATENT DOCUMENTS

| | | |
|---|---|---|
| 2,472,165 | 6/1949 | Mankin . |
| 2,678,405 | 5/1954 | Goodrich . |
| 2,679,614 | 5/1954 | Friend . |
| 2,698,400 | 12/1954 | Schreiber . |
| 2,706,796 | 4/1955 | Tannenbaum et al. . |
| 2,728,022 | 12/1955 | Carpenter, Jr. . |
| 2,749,473 | 6/1956 | Nelson . |
| 2,836,761 | 5/1958 | Howitt et al. . |
| 2,880,358 | 3/1959 | Parker .............................. 315/31 TV |
| 2,901,661 | 8/1959 | Neuhauser . |
| 2,999,186 | 9/1961 | Pritchard et al. . |
| 3,188,516 | 6/1965 | De France et al. . |
| 3,356,792 | 12/1967 | Peters . |
| 3,412,281 | 11/1968 | Richards et al. ............... 315/31 TV |
| 3,803,444 | 4/1974 | Gerritsen et al. . |
| 3,902,100 | 8/1975 | Nakagawa et al. . |
| 4,125,795 | 11/1978 | Ikebata et al. ........................ 315/368 |

Primary Examiner—Theodore M. Blum
Attorney, Agent, or Firm—Margaret Marsh Parker; James W. Gillman

[57] ABSTRACT

Dynamic focus circuitry for a CRT data display terminal provides high resolution even in the corners of the screen by means of a dynamic focus voltage which is the product of parabolic waveforms at horizontal line rate and vertical frame rate. The non-linear characteristic of a diode provides the product function at minimum expense.

3 Claims, 4 Drawing Figures

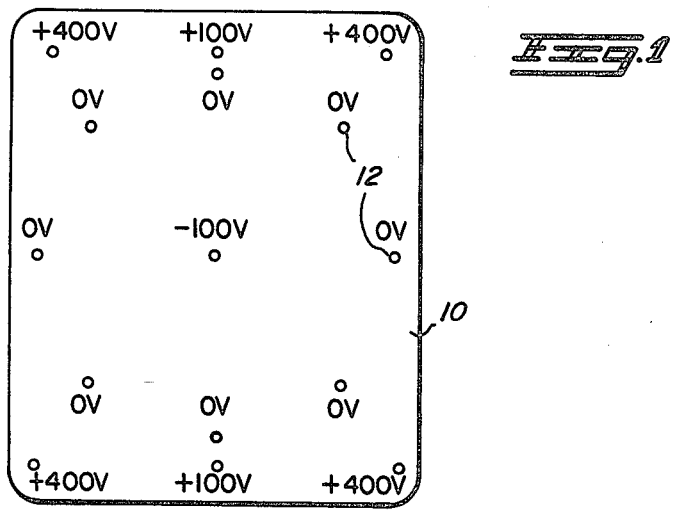
Fig.1
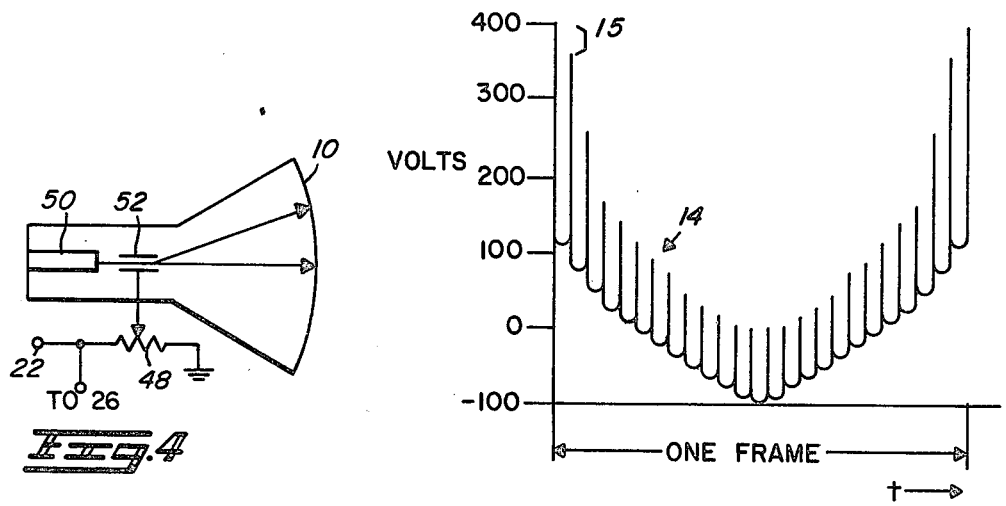
Fig.4
Fig.2
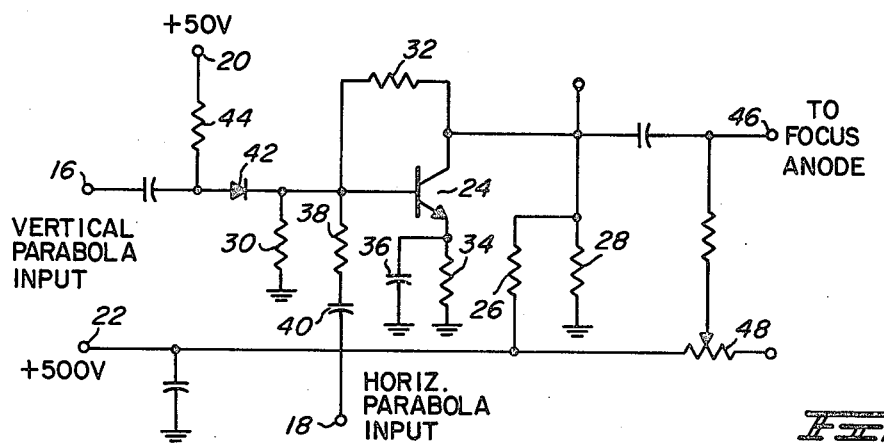
Fig.3

DYNAMIC FOCUS CIRCUITRY FOR A CRT DATA DISPLAY TERMINAL

BACKGROUND OF THE INVENTION

This invention relates to the field of CRT devices in data display terminals and, more particularly, to the provision of improved resolution even in the outermost areas of the CRT display.

Since the screens of most cathode ray tubes are as nearly flat as it is economical to make them, a problem arises in causing the electron beam to be sharply focused at all points of the screen. The problem arises because the beam must travel varying distances to the various points on the screen, the variation being a function of the distance from the longitudinal axis of the screen to the given point. The most common solution is to set the static (DC) focus voltage at a level which will provide optimum focusing at some point intermediate the center of the screen and the farthest away points with minimum defocusing at both the center and the corners. Also, schemes have been proposed for adding varying voltages to the static focusing voltage. One such scheme adds to the static voltage the sum of one parabolic waveform at horizontal line rate and one at vertical frame rate. This scheme is disclosed in a copending U.S. patent application Ser. No. 908,297, assigned to the same assignee as is the present invention. The scheme provides greatly improved resolution over the entire CRT screen, however, with the increased use of CRT devices as in a display terminal where the entire screen area is used for the display of relatively small alphanumeric characters, a need is felt for still more resolution, particularly in the far corners of the screen.

SUMMARY OF THE INVENTION

It is therefore an object of the present invention to provide for improved resolution at all points of a CRT screen, particularly those farthest from the axis of the tube.

It is another object of this invention to provide the improvement in the least expensive but satisfactory fashion.

In circuitry in accordance with the present invention, these objectives and others are attained by multiplying a parabolic waveform at the horizontal line rate by another parabolic waveform at vertical frame rate and adding the product to a static focusing voltage. The multiplication function is obtained by use of a non-linear diode characteristic.

BRIEF DESCRIPTION OF THE DRAWING

FIG. 1 is a representation of a CRT screen with sample required voltages indicated.

FIG. 2 is a waveform of the required voltage in the circuit of the invention.

FIG. 3 is a schematic diagram of an embodiment of the circuitry.

FIG. 4 is a representation of a portion of a cathode ray tube.

DETAILED DESCRIPTION OF THE PREFERRED EMBODIMENT

FIG. 1 represents the display screen 10 of a particular CRT data terminal. At various points on the screen voltages are indicated which represent experimental results obtained by manually adjusting the focus control of the CRT to achieve the highest degree of resolution obtainable at the respective points. It will be observed that the particular CRT tested required no additional voltage at a number of points 12 (actually a ring of points). At the very center of the screen, the required voltage was −100 volts. At the outer corners, the required voltage was +400 volts. From the figure, it will be seen that along the horizontal line at or near the top of the frame, the additional focus voltage must vary from +400 volts to +100 volts and swing back to +400 volts, whereas along a line at or near the middle of the screen, the voltage must go from 0 volts to −100 volts and back to 0.

In FIG. 2 a waveform 14 is shown which closely approximates the required waveform over the time period of one frame. It will be appreciated that the drawing has been simplified for clarity, with only 25 horizontal lines shown per frame. This simplification however introduces an apparent distortion as may be seen, for example, in the waveform 15 for the first horizontal line which appears to go from +400 volts to +100 volts to only 360 volts.

The waveform 14 of FIG. 2 is clearly seen to require something other than the addition of two parabolic waveforms at horizontal line and vertical frame rates, as disclosed in the above-referenced application. On analysis, this complex waveform is a close approximation to the product of two such parabolic waveforms.

FIG. 3 is a schematic of a circuit which will provide the necessary product function. While it will be obvious that such a product function could be provided by the circuitry of a four quadrant multiplier such as the Motorola MC1595, the degree of precision such an integrated circuit device can provide is not required in the present application. Therefore, the circuit of FIG. 3 was developed to provide the product function satisfactorily with only two active devices.

As to the operation of the circuit of FIG. 3, the appropriate vertical rate parabola is coupled to an input terminal 16. The horizontal line rate waveform is coupled to an input terminal 18. A terminal 20 supplies +50 volts and a terminal 22 supplies +500 volts. A transistor 24 operates as a conventional one stage amplifier wherein resistor 26 is the collector load and resistor 28 limits the collector voltage to a safe level. Resistors 30, 32 and 34 bias the transistor 24 into its linear region. Capacitor 36 bypasses the emitter circuit of transistor 24 to increase the AC gain and reduce the input impedance of the state. The horizontal line rate waveform is injected through resistor 38 and capacitor 40 to a diode 42 and the base of transistor 24. Resistor 44 is coupled between the terminal 20 and the diode 42 and sources approximately 100 microamps, bringing diode 42 into the knee of its E/I curve. Since the diode 42 is operating at the knee of its curve, the vertical parabola from terminal 16 is injected through a non-linear impedance. Thus, the horizontal parabola is "modulated" at the vertical rate, or in other words, the horizontal parabola is "selectively loaded" by the vertical parabola through the non-linear impedance of transistor 24. In this way, the product of the horizontal and vertical signals from terminals 16 and 18 appears at an output terminal 46, in the form shown in FIG., 2, where it is combined with the static focus voltage terminal 22, controlled by focus control 48.

FIG. 4 shows portions of a CRT with screen 10, electron gun 50, and focus anode 52 coupled to the focus control 148.

Thus there has been shown and described circuitry for improving the dynamic focus of a CRT data display terminal by providing to the focus anode an added voltage which is a product of parabolic waveforms at both horizontal line and vertical frame rate, it having been determined empirically that such a waveform provides optimum focusing at all points on the display screen. While other variations and modifications of the invention are possible, it is intended to cover all those which fall within the spirit and scope of the appended claims.

What is claimed is:

1. In a cathode ray tube device requring high resolution as for data display, the combination comprising:
    means for supplying an electron beam;
    focusing means positioned to focus said electron beam;
    high voltage supply means coupled to the focusing element for supplying an adjustable DC focus voltage;
    first circuit means coupled to the focusing element for supplying a signal having a parabolic waveform at the vertical frame rate;
    second circuit means coupled to the focusing element for supplying a second signal having a parabolic waveform at the horizontal line rate; and
    circuit means coupled to the focusing element for multiplying the output signals of the first and second circuit means to provide a dynamic focusing voltage.

2. In a cathode ray tube device in accordance with claim 1 and wherein the circuit means for multiplying signals comprises a diode means operative in a non-linear fashion.

3. In a cathode ray tube device in accordance with claim 2, and further including amplifier means coupled to the circuit means for multiplying signals and to the focusing element for amplifying the multiplied signals before coupling said signals to the focusing element.

* * * * *